June 3, 1930.　　F. BRUSCH DI NEUBERG　　1,761,468
HUB CAP
Filed April 2, 1929　　2 Sheets-Sheet 1
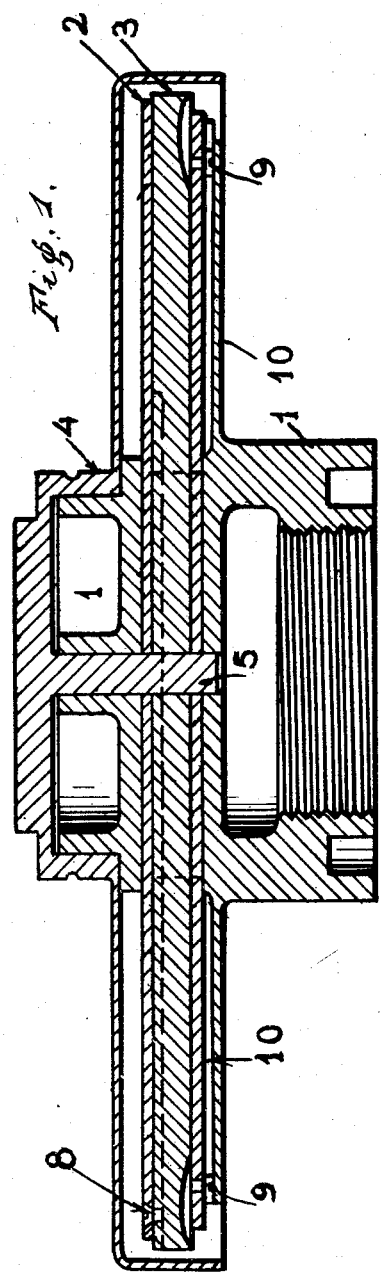
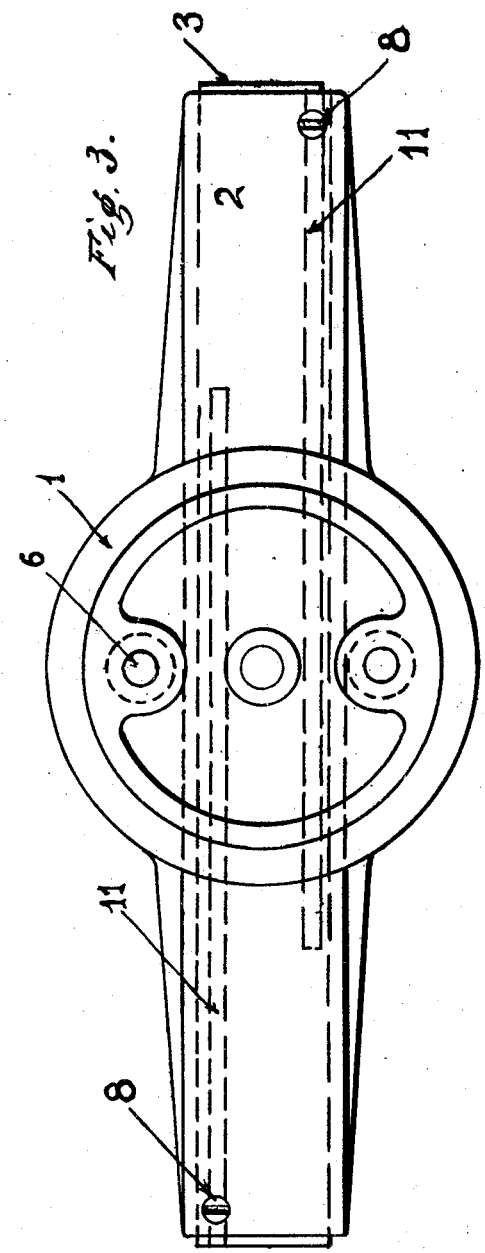
F. Brusch Di Neuberg
INVENTOR

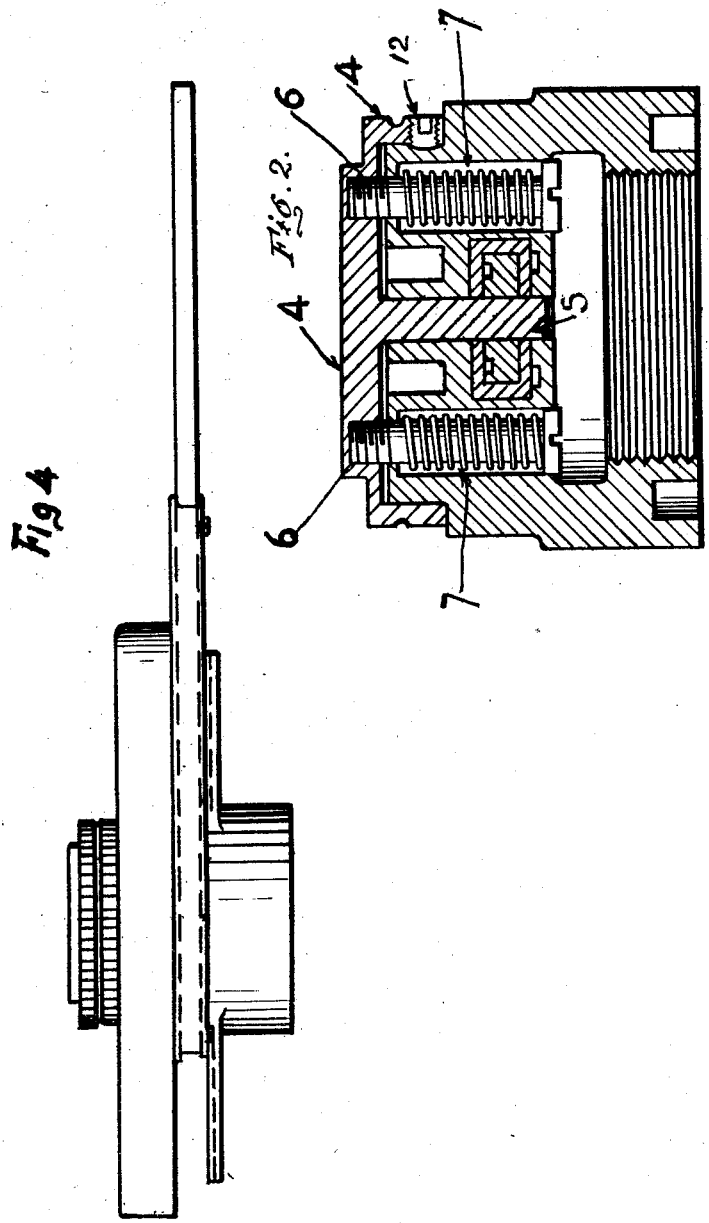

Patented June 3, 1930

1,761,468

UNITED STATES PATENT OFFICE

FERDINANDO BRUSCH DI NEUBERG, OF TREVISO, ITALY

HUB CAP

Application filed April 2, 1929, Serial No. 351,901, and in Italy April 13, 1928.

The present invention provides an axle cap for road vehicle wheel hubs, which differs from all those heretofore in use inasmuch as it contains among its parts all implements that are required to screw it on place and unscrew it, so that no tools such as hammers or wrenches are necessary.

The axle cap according to the invention is illustrated in the accompanying drawing. In Figs. 1, 2, 3 the axle cap is shown in detail to a larger scale in rest position; Fig. 4 is a side elevation, on a smaller scale, of the cap as applied to the road vehicle wheels, ready for operation.

The piece 1 is screwed in place and exhibits a recess, in which a sheath 2 is a sliding fit. A lever 3 is a sliding fit in the sheath 2, and a common bore traverses both the sheath 2 and the lever 3 midway of their length.

A box 4 serves as a cover and encloses all the mentioned parts when at rest. To the box 4 a bolt 5 is rigidly attached; this bolt traverses the common bore of the sheath 2 and lever 3, and its end is lodged in a center hole of the piece 1, the sheath and the lever being thus secured in their rest position.

Two helical springs 7, lodged in special housings in the piece 1 and acting upon the heads of two screws 6 driven into the box 4, draw the box towards the piece 1 and hold it in place.

A set screw 12 (Fig. 2) is driven by means of a special key into the box 4 and enters a corresponding seat provided in the piece 1; the said screw prevents the apparatus from being tampered with by persons not being in possession of the special key.

While Figs. 1 and 2 show the complete apparatus in longitudinal and cross section respectively, in the front view, Fig. 3 the box 4 is removed.

The working is as follows:

The set screw 12 is first loosened and the box 4 pulled in outward direction against the action of the spring 7 till the bolt 5 is completely extracted from the bore of the sheath 2 and lever 3 and the box 4 leaves the ends of the sheath and lever free. The sheath and lever thus released are now drawn out, both of them in the same direction, and in this condition they supply a slidable or telescopic lever by means of which the axle cap can be screwed on or loosened as may be desired.

Two small screws 8 with flush head are driven into the sheath 2, their ends engaging two longitudinal grooves 11 formed in the lever 3, the grooves being symmetrically arranged relatively to the lever and shorter than the lever, so that the said screws limit the lever stroke to the distance allowed by the grooves.

Two further small screws 9 are provided on the sheath 2; these screws have each a protruding head and engage the grooves 10 provided in the two wings of the piece 1, these screws serving to limit the sheath stroke.

Having now particularly described and ascertained the nature of my said invention and in what manner the same is to be performed, I declare that what I claim is:—

1. A hub cap including a body, and a telescopic member carried by the body and adapted, when extended, to facilitate application and removal of the hub cap.

2. A hub cap including a body, a telescopic member carried by said body, and an enclosure for the telescopic member carried by the body and provided with means engageable with said member to retain the latter in inoperative position.

Signed at Milan (Italy), this 16th day of March, 1929.

FERDINANDO BRUSCH di NEUBERG.